US011877378B2

(12) United States Patent
Wu et al.

(10) Patent No.: US 11,877,378 B2
(45) Date of Patent: Jan. 16, 2024

(54) PLASMA FINE BUBBLE LIQUID GENERATING APPARATUS

(71) Applicant: National Yang Ming Chiao Tung University, Hsinchu (TW)

(72) Inventors: Jong-Shinn Wu, Hsinchu (TW); Chih-Tung Liu, Taipei (TW); Chun-Ping Hsiao, Taichung (TW); Chun-Hao Chang, Changhua County (TW)

(73) Assignee: NATIONAL YANG MING CHIAO TUNG UNIVERSITY, Hsinchu (TW)

( * ) Notice: Subject to any disclaimer, the term of this patent is extended or adjusted under 35 U.S.C. 154(b) by 133 days.

(21) Appl. No.: 17/450,285

(22) Filed: Oct. 8, 2021

(65) Prior Publication Data

US 2023/0116658 A1 Apr. 13, 2023

(51) Int. Cl.
*H01J 37/32* (2006.01)
*H05H 1/48* (2006.01)
(Continued)

(52) U.S. Cl.
CPC .............. *H05H 1/245* (2021.05); *H05H 1/48* (2013.01); *H05H 1/52* (2013.01); *H05H 2242/20* (2021.05)

(58) Field of Classification Search
CPC ............. H01J 37/3244; H01J 37/32018; H01J 37/32027; H01J 37/32825; H05H 1/48; H05H 1/52; H05H 1/245
See application file for complete search history.

(56) References Cited

U.S. PATENT DOCUMENTS 6,368,678 B1 * 4/2002 Bluck ................. H01J 37/3233 427/571
8,264,154 B2 * 9/2012 Banner ............. H01J 37/32155 315/344

(Continued)

FOREIGN PATENT DOCUMENTS

WO 2015072461 A1 5/2015
WO 2016089104 A1 6/2016

OTHER PUBLICATIONS

H. Ikeura et al., "Removal of residual pesticide, fenitrothion, in vegetables by using ozone microbubbles generated by different methods", Journal of Food Engineering, vol. 103, 2011, pp. 345-349.

(Continued)

*Primary Examiner* — Tung X Le
(74) *Attorney, Agent, or Firm* — CKC & Partners Co., LLC

(57) ABSTRACT

An apparatus includes a fine bubble generator, a gas supplying source, a first plasma generator, a second plasma generator, a power source and a control module. The fine bubble generator is configured to generate fine bubbles in a liquid. The gas supplying source is configured to supply a working gas. The first plasma generator is configured to generate a first plasma gas from the working gas. The second plasma generator is configured to generate a second plasma gas from the working gas. The power source is configured to supply electricity to the first plasma generator and the second plasma generator. The control module is configured to adjust the power source to provide power to the first plasma generator and the second plasma generator. The first plasma gas and the second plasma gas are directed into the liquid.

10 Claims, 13 Drawing Sheets

(51) Int. Cl.
*H05H 1/24* (2006.01)
*H05H 1/52* (2006.01)

(56) References Cited

U.S. PATENT DOCUMENTS

| | | | | |
|---|---|---|---|---|
| 10,300,160 | B2 | 5/2019 | Lu et al. | |
| 11,337,296 | B2 * | 5/2022 | Huh | H01J 27/028 |
| 2013/0291794 | A1 * | 11/2013 | Sanematsu | H05H 1/2406 118/688 |
| 2014/0138029 | A1 * | 5/2014 | Narita | C02F 1/78 156/345.24 |
| 2016/0362311 | A1 * | 12/2016 | Kimiya | A61L 2/18 |
| 2017/0291830 | A1 * | 10/2017 | Kang | H01J 37/32568 |
| 2017/0354024 | A1 * | 12/2017 | Lu | C02F 1/72 |
| 2022/0151698 | A1 * | 5/2022 | Winkelman | A61B 18/14 |

OTHER PUBLICATIONS

Tomohiro Shibata et al., "Water Treatment Characteristics Using Activated Air Microbubble Jet with Photochemical Reaction", Journal of Fluid Science and Technology, vol. 6, No. 2, 2011, pp. 242-251.

Yanan Liu et al., "Degradation of aniline in aqueous solution using non-thermal plasma generated in microbubbles" Chemical Engineering Journal, vol. 345, 2018, pp. 679-687.

Alexander Wright et al., "Microbubble-enhanced dielectric barrier discharge pretreatment of microcrystalline cellulose", Biomass and Bioenergy, vol. 118, 2018, pp. 46-54.

Mu-Chien Wu et al., "Dissolution enhancement of reactive chemical species by plasma-activated microbubbles jet in water", Journal of Physics D: Applied Physics, vol. 53, 2020.

Andreas Schütze et al. "The Atmospheric-Pressure Plasma Jet: A Review and Comparison to Other Plasma Sources", IEEE Transactions On Plasma Science, vol. 26, No. 6, Dec. 1998, pp. 1685-1694.

Muhammad Arif Malik et al., "Ozone-free nitric oxide production using an atmospheric pressure surface discharge—A way to minimize nitrogen dioxide co-production", Chemical Engineering Journal, vol. 283, 2016, pp. 631-638.

* cited by examiner

PLASMA FINE BUBBLE LIQUID GENERATING APPARATUS

BACKGROUND

Technical Field

The present disclosure relates to plasma fine bubble liquid generating apparatus.

Description of Related Art

With the advancement of technology nowadays, the use of micro/nano-bubble liquid (fine bubble liquid) has also become very extensive. Practically, micro/nano-bubble liquid can be used in fields such as medical treatment, beauty, sterilization and industry. For example, micro/nano-bubbles have at least the following characteristics: (1) the gas inside the micro/nano-bubbles has a larger pressure difference and a larger contact area with the original part of the aqueous solution, making it easier for the gas in the bubbles to dissolve in water; (2) micro/nano-bubbles have a longer residence time in the water; (3) micro/nano-bubbles can overcome the problem of surface tension, such that they can penetrate into the fine pores to achieve a better cleaning effect; and (4) when the micro/nano-bubbles burst, hydroxyl radicals will be generated, which is of a great help in the industry of medical sterilization and medical aesthetics.

Therefore, the method to generate micro/nano-bubble liquid in a more flexible manner is undoubtedly an important direction of development of the industry.

SUMMARY

A technical aspect of the present disclosure is to provide an apparatus, which can respectively adjust the amount of production of plasma gases of nitric oxide and ozone in a simple manner.

According to an embodiment of the present disclosure, an apparatus includes a fine bubble generator, a gas supplying source, a first plasma generator, a second plasma generator, a power source and a control module. The fine bubble generator is configured to generate fine bubbles in a liquid. The gas supplying source is configured to supply a working gas. The first plasma generator is configured to generate a first plasma gas from the working gas. The second plasma generator is configured to generate a second plasma gas from the working gas. The power source is configured to supply electricity to the first plasma generator and the second plasma generator. The control module is configured to adjust the power source to provide power to the first plasma generator and the second plasma generator. The first plasma gas and the second plasma gas are directed into the liquid.

In one or more embodiments of the present disclosure, the apparatus further includes a liquid inlet pipe, a liquid outlet pipe and a gas inlet pipe. The liquid inlet pipe is configured to direct the liquid into the fine bubble generator. The liquid outlet pipe is configured to discharge the liquid from the fine bubble generator. The gas inlet pipe is configured to direct the first plasma gas and/or the second plasma gas into the liquid inlet pipe and/or the liquid outlet pipe.

In one or more embodiments of the present disclosure, the power source includes a first contact point and a second contact point. The first plasma generator includes a first electrode and a second electrode. The first electrode is electrically connected with the first contact point. The second electrode is electrically connected with the second contact point. The second electrode and the first electrode are separated from each other by a distance. When the first contact point is connected with a power line, the second contact point is connected with a ground line or connected to a ground. When the second contact point is connected with the power line, the first contact point is connected with the ground line or connected to the ground. A range of the distance is between 0.3 mm and 30 mm.

In one or more embodiments of the present disclosure, the apparatus further includes a gas inlet pipe. The gas inlet pipe is configured to direct the first plasma gas and/or the second plasma gas into the fine bubble generator. The fine bubble generator is at least partially immersed in the liquid.

In one or more embodiments of the present disclosure, the power source includes a first contact point and a second contact point. The second plasma generator includes a dielectric tube, an external electrode and an internal electrode. The dielectric tube is of an insulating material. The external electrode is electrically connected with the first contact point and sleeved outside an outer wall of the dielectric tube. The internal electrode is electrically connected with the second contact point and extends along an inner wall of the dielectric tube. When the first contact point is connected with a power line, the second contact point is connected with a ground line or connected to a ground. When the second contact point is connected with the power line, the first contact point is connected with the ground line or connected to the ground.

In one or more embodiments of the present disclosure, the apparatus further includes a chamber and a switch. The first plasma generator and the second plasma generator are located inside the chamber. The switch is configured to switch the power to the first plasma generator and the second plasma generator.

In one or more embodiments of the present disclosure, the first plasma generator and the second plasma generator are connected in parallel. The working gas partially flows through the first plasma generator and partially flows through the second plasma generator.

In one or more embodiments of the present disclosure, the first plasma generator and the second plasma generator are connected in series. The working gas first flows through the first plasma generator and then flows through the second plasma generator. The working gas first flows through the second plasma generator and then flows through the first plasma generator.

In one or more embodiments of the present disclosure, the apparatus further include a liquid inlet pipe, a liquid outlet pipe and a gas inlet pipe. The liquid inlet pipe is configured to direct the liquid into the fine bubble generator. The liquid outlet pipe is configured to discharge the liquid from the fine bubble generator. The gas inlet pipe is configured to direct the first plasma gas and/or the second plasma gas into the fine bubble generator.

In one or more embodiments of the present disclosure, the fine bubble generator is at least partially immersed in the liquid.

When compared with the prior art, the above-mentioned embodiments of the present disclosure have at least the following advantage:

(1) Since the plasma generating module includes at least one first plasma generator and at least one second plasma generator, the apparatus can generate at least two different types of plasmas, such that the flexibility of operation of the apparatus is enhanced.

(2) Since the second subsidiary power source is independent of the first subsidiary power source, according to the actual situations, the user can choose to only start up the first subsidiary power source but not start up the second subsidiary power source, only start up the second subsidiary power source but not start up the first subsidiary power source, or start up both of the first subsidiary power source and the second subsidiary power source at the same time. When both of the first subsidiary power source and the second subsidiary power source are started up at the same time, the plasma generating module can provide a mixed plasma gas consisting of the first plasma gas and the second plasma gas. In this way, the flexibility of operation of the apparatus is effectively enhanced.

(3) By using the control module to respectively start up the first subsidiary power source and the second subsidiary power source, and respectively adjust the conditions of electricity supply, including intermittent duty cycle, frequency and/or voltage, of the first subsidiary power source and the second subsidiary power source, the user can respectively adjust the amount of production of the first plasma gas and the second plasma gas, and also the volume ratio between the first plasma gas and the second plasma gas. Thus, the operation of the apparatus becomes substantially convenient.

(4) By the operation of the first plasma generator, the plasma generating module can generate plasma gas containing plenty of nitric oxide.

(5) By the operation of the second plasma generator, the plasma generating module can generate plasma gas containing plenty of ozone.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
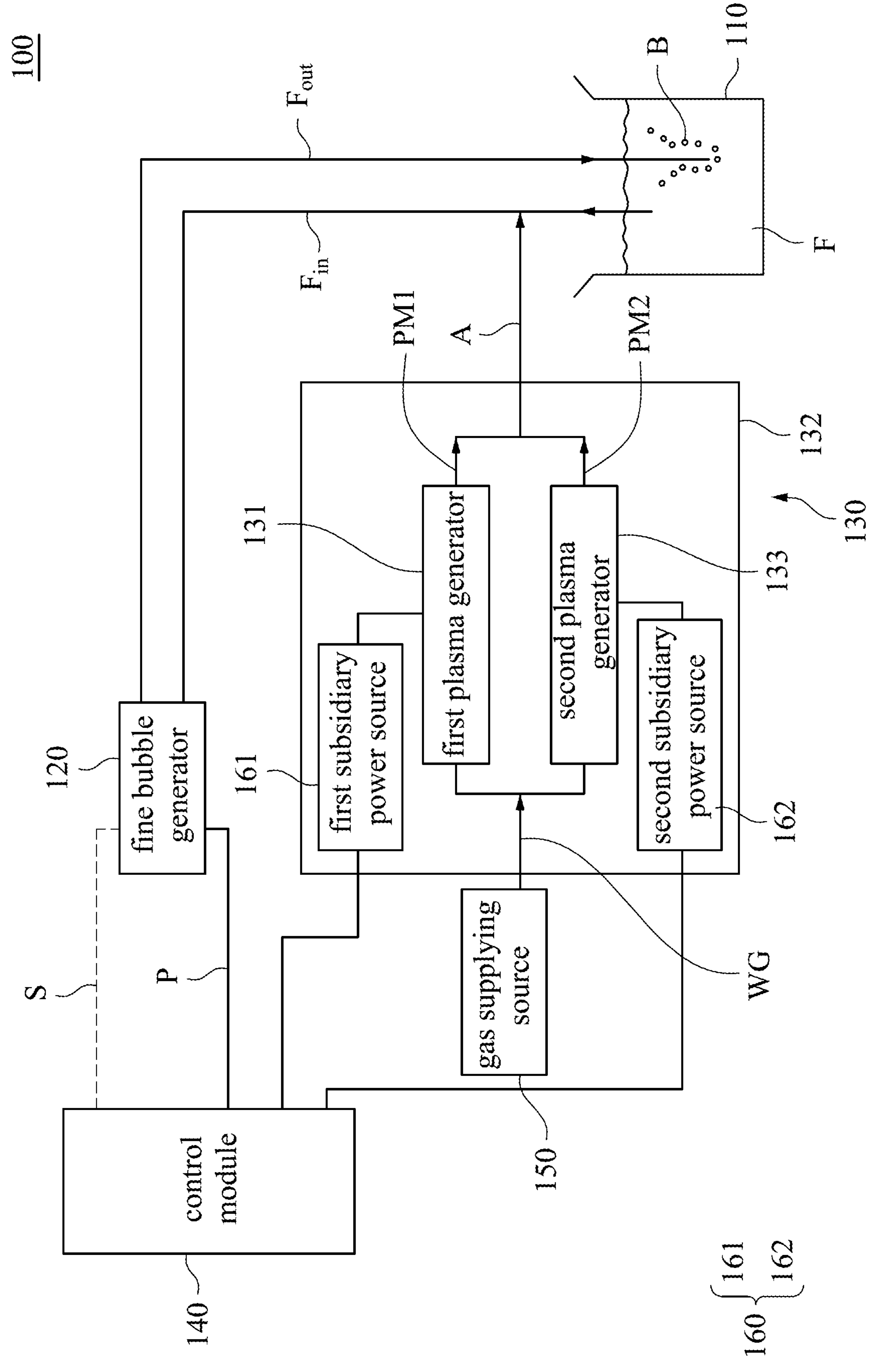
FIG. 1 is a schematic view of a plasma fine bubble liquid generating apparatus according to an embodiment of the present disclosure.

Drawings will be used below to disclose embodiments of the present disclosure. For the sake of clear illustration, many practical details will be explained together in the description below. However, it is appreciated that the practical details should not be used to limit the claimed scope. In other words, in some embodiments of the present disclosure, the practical details are not essential. Moreover, for the sake of drawing simplification, some customary structures and elements in the drawings will be schematically shown in a simplified way. Wherever possible, the same reference numbers are used in the drawings and the description to refer to the same or like parts.

Unless otherwise defined, all terms (including technical and scientific terms) used herein have the same meanings as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a schematic view of a plasma fine bubble liquid generating apparatus 100 according to an embodiment of the present disclosure. A plasma fine bubble liquid generating apparatus 100 includes a fine bubble generator 120, a plasma generating module 130 and a control module 140. The control module 140 is electrically connected with the fine bubble generator 120. The control module 140 supplies electricity to the fine bubble generator 120 by an electric cable P and controls the fine bubble generator 120 by a signal cable S. The fine bubble generator 120 is fluidly communicated with a liquid tank 110 through a liquid inlet pipe $F_{in}$ and a liquid outlet pipe $F_{out}$, such that a liquid F is circulated between the fine bubble generator 120 and the liquid tank 110. For the sake of drawing simplification, in FIG. 1, the liquid inlet pipe $F_{in}$ and the liquid outlet pipe $F_{out}$ are respectively presented by a single line. In practice, the liquid inlet pipe $F_{in}$ and the liquid outlet pipe $F_{out}$ are respectively shaped as a pipe. To be specific, the liquid inlet pipe $F_{in}$ is configured to direct the liquid F into the fine bubble generator 120, and the liquid outlet pipe $F_{out}$ is configured to discharge the liquid F from the fine bubble generator 120. The liquid tank 110 is configured to accommodate the liquid F. In practice, the liquid F can be water. However, this does not intend to limit the present disclosure. To be specific, the fine bubble generator 120 is configured to generate fine bubbles in the liquid F, and to drive the liquid F to flow between the fine bubble generator 120 and the liquid tank 110 to form the fluid circulation. In other words, the liquid F is driven by the fine bubble generator 120 to flow from the liquid tank 110 to the fine bubble generator 120 through the liquid inlet pipe $F_{in}$, and then return to the liquid tank 110 through the liquid outlet pipe $F_{out}$ from the fine bubble generator 120 after fine bubbles are generated. To be specific, the fine bubble generator 120 may include a pump, a tapered tube or a Venturi tube, making use of change of pressure and flowing speed to generate the fine bubbles. However, this does not intend to limit the present disclosure.

Moreover, the plasma fine bubble liquid generating apparatus 100 further includes a gas inlet pipe A. The plasma generating module 130 is fluidly communicated with the fluid circulation as mentioned above through the gas inlet pipe A. This means the plasma generating module 130 is fluidly communicated with a path along which the liquid F flows between the fine bubble generator 120 and the liquid tank 110. To be specific, the intersection point at which the gas inlet pipe A of the plasma generating module 130 is communicated with the fluid communication can be located at the upstream (i.e., located at the liquid inlet pipe $F_{in}$) or the downstream (i.e., the liquid outlet pipe $F_{out}$) of the fine bubble generator 120. However, this does not intend to limit the present disclosure. For example, as shown in FIG. 1, the intersection point at which the gas inlet pipe A of the plasma generating module 130 is communicated with the fluid communication is located at the liquid inlet pipe $F_{in}$.

Furthermore, the plasma fine bubble liquid generating apparatus 100 further includes a gas supplying source 150. As shown in FIG. 1, the gas supplying source 150 is fluidly communicated with the plasma generating module 130, and is configured to supply a working gas WG to the plasma generating module 130. The plasma fine bubble liquid generating apparatus 100 further includes a power source 160. The power source 160 further includes a first subsidiary power source 161 and a second subsidiary power source 162. The plasma generating module 130 includes a chamber 132, at least one first plasma generator 131 and at least one second plasma generator 133. The first plasma generator 131 and the second plasma generator 133 are located inside the chamber 132. The first subsidiary power source 161 supplies electricity to the first plasma generator 131, and generates a high electric field in the first plasma generator 131. The working gas WG is dissociated by the high electric field after entering into the first plasma generator 131 to generate a first plasma gas PM1. On the other hand, the second subsidiary power source 162 supplies electricity to the second plasma generator 133, and generates a high electric field in the second plasma generator 133. The working gas WG is dissociated by the high electric field after entering into the second plasma generator 133 to generate a second plasma gas PM2 which is different from the first plasma gas PM1. It is worth to note that, the second subsidiary power source 162 is independent of the first subsidiary power source 161. The first subsidiary power source 161 and the second subsidiary power source 162 are both practically high voltage AC power supplies or high voltage DC pulse power suppliers. In this embodiment, the first plasma gas PM1 generated is nitric oxide (NO), and the second plasma gas PM2 generated is ozone ($O_3$). As mentioned above, since the second plasma gas PM2 is different from the first plasma gas PM1, the flexibility of operation of the plasma fine bubble liquid generating apparatus 100 is enhanced.

It is worth to note that, since the plasma generating module 130 includes at least one first plasma generator 131 and at least one second plasma generator 133, the plasma fine bubble liquid generating apparatus 100 can generate at least two different types of plasmas, such that the flexibility of operation of the plasma fine bubble liquid generating apparatus 100 is enhanced.

In practical applications, the working gas WG can be flown to the plasma generating module 130 by method of actively supplying the working gas WG. For example, a high pressure cylinder or pressurized equipment is utilized. Moreover, the working gas WG can be flown to the plasma generating module 130 by method of passively sucking the working gas WG. For example, the lower pressure formed by the flow of the liquid F sucks the working gas WG into the plasma generating module 130. The type of the working gas WG can be air, nitrogen, oxygen, argon, helium, carbon dioxide or a mixture of different combinations of these gases.

To be specific, as shown in FIG. 1, the control module 140 is electrically connected with the first subsidiary power source 161 and the second subsidiary power source 162. Moreover, the control module 140 is configured to respectively start up the first subsidiary power source 161 and the second subsidiary power source 162. In details, since the second subsidiary power source 162 is independent of the first subsidiary power source 161 as mentioned above, according to the actual situations, the user can choose to only start up the first subsidiary power source 161 but not start up the second subsidiary power source 162, only start up the second subsidiary power source 162 but not start up the first subsidiary power source 161, or start up both of the first subsidiary power source 161 and the second subsidiary power source 162 at the same time. When both of the first subsidiary power source 161 and the second subsidiary power source 162 are started up at the same time, the plasma generating module 130 can provide a mixed plasma gas consisting of the first plasma gas PM1 and the second plasma gas PM2. In this way, the flexibility of operation of the plasma fine bubble liquid generating apparatus 100 is effectively enhanced.

In addition, the control module 140 is further configured to adjust the first subsidiary power source 161 and the second subsidiary power source 162 to provide power to the first plasma generator 131 and the second plasma generator 133 through the adjustment of a plurality of conditions of the respective electricity supply, in order to adjust the amount of production of the first plasma gas PM1 and the second plasma gas PM2. The conditions of electricity supply include intermittent duty cycle, frequency and/or voltage. In details, according to the actual situation, under that condition that only the first subsidiary power source 161 is started up but the second subsidiary power source 162 is not started up, the control module 140 can adjust the intermittent duty cycle, frequency and/or voltage of the first subsidiary power source 161, in order to adjust the amount of production of the first plasma gas PM1. Similarly, under that condition that only the second subsidiary power source 162 is started up but the first subsidiary power source 161 is not started up, the control module 140 can adjust the intermittent duty cycle, frequency and/or voltage of the second subsidiary power source 162, in order to adjust the amount of production of the second plasma gas PM2. Moreover, under that condition that both of the first subsidiary power source 161 and the second subsidiary power source 162 are started up, the control module 140 can respectively adjust the intermittent duty cycle, frequency and/or voltage of the first subsidiary power source 161 and the second subsidiary power source 162, in order to respectively adjust the amount of production of the first plasma gas PM1 and the second plasma gas PM2, and also the volume ratio between the first plasma gas PM1 and the second plasma gas PM2. In practical applications, by using the control module 140 to respectively start up the first subsidiary power source 161 and the second subsidiary power source 162, and respectively adjust the intermittent duty cycle, frequency and/or voltage of the first subsidiary power source 161 and the second subsidiary power source 162, the user can respectively adjust the amount of production of the first plasma gas PM1 and the second plasma gas PM2, and also the volume ratio between the first plasma gas PM1 and the second plasma gas PM2. Thus, the operation of the plasma fine bubble liquid generating apparatus 100 becomes substantially convenient.

FIGS. 2A-2F are schematic views of various possible embodiments of the first plasma generator 131 of FIG. 1. In these embodiments, the first plasma generator 131 is a spark-type or an arc-type plasma generator. To be specific, the first plasma generator 131 includes a first chamber 1311, a first electrode 1314 and a second electrode 1315. The first chamber 1311 has an entrance 1312 and an exit 1313. The entrance 1312 and the exit 1313 are opposite to each other. The first subsidiary power source 161 has a first contact point 161*a* and a second contact point 161*b*. The first electrode 1314 is electrically connected with the first contact point 161*a* of the first subsidiary power source 161. The second electrode 1315 is electrically connected with the second contact point 161*b* of the first subsidiary power source 161. When the first contact point 161*a* is connected with a power line (not shown), the second contact point 161*b* is connected with a ground line (not shown) or connected to a ground. On the other hand, when the second contact point 161*b* is connected with the power line, the first contact point 161*a* is connected with the ground line or connected to the ground. It is worth to note that, an end of the second electrode 1315 away from the second contact point 161*b* and an end of the first electrode 1314 away from the first contact point 161*a* are separated from each other by a distance GP1, and it is suitable to form an electric discharge (spark or arc) between the ends of the first electrode 1314 and the second electrode 1315.

For example, when the first plasma generator 131 is operated, the first subsidiary power source 161 respectively supplies electricity to the first electrode 1314 and the second electrode 1315, and the working gas WG enters into the first chamber 1311 through the entrance 1312. The working gas WG is then dissociated by the high electric field between the first electrode 1314 and the second electrode 1315 inside the first chamber 1311 to form the first plasma gas PM1. Afterwards, the first plasma gas PM1 leaves from the first chamber 1311 through the exit 1313, and is then directed to the liquid inlet pipe $F_{in}$ through the gas inlet pipe A. This means the first plasma gas PM1 flows to and is directed to the liquid F flowing along the fluid circulation. As driven by the fine bubble generator 120, the first plasma gas PM1 in the liquid F is also delivered to the liquid tank 110 to form plasma fine bubbles B (please see FIG. 1) in micro/nano-magnitudes for subsequent usages. By the operation of spark-type plasma generator (i.e., the first plasma generator 131), as mentioned above, the first plasma gas PM1 generated is nitric oxide.

Figures 2A, 2B, 2C, 2D, 2E, 2F:
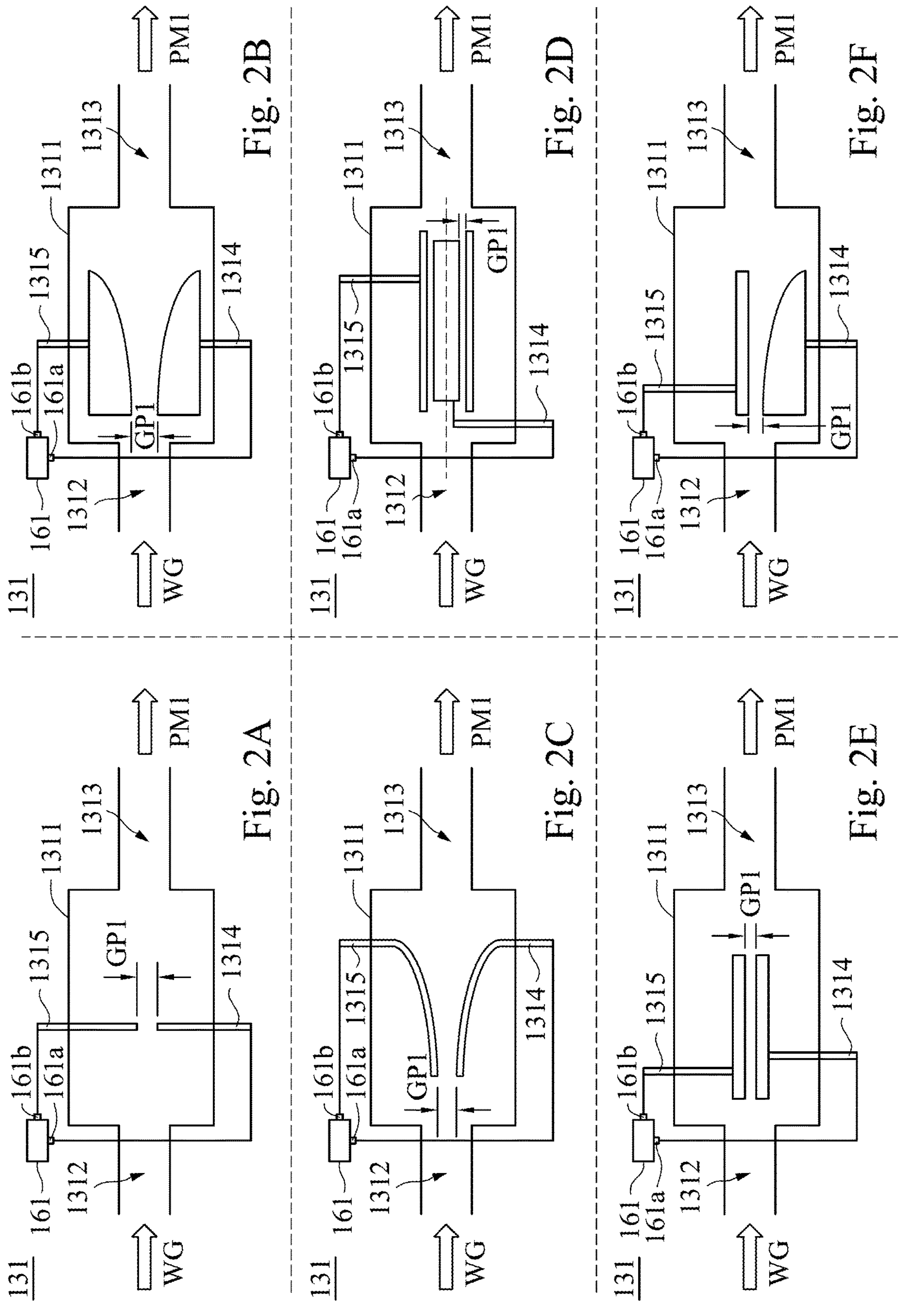
FIGS. 2A-2F are schematic views of various possible embodiments of the first plasma generator of FIG. 1.

In addition, for the first plasma generator 131 as mentioned above, its electrodes (i.e., the first electrode 1314 and the second electrode 1315) can be shaped as two strips (please see FIG. 2A), two knives (please see FIG. 2B), two arcs (please see FIG. 2C), two concentric circles (a circular rod at the center with a circular tube at the outside, please see FIG. 2D), two flat boards (please see FIG. 2E), or a combination of the shapes as mentioned above (please see FIG. 2F, for example, one shaped as a knife and another shaped as a flat board). However, these shapes do not intend to limit the present disclosures. As mentioned above, the first plasma gas PM1 can be formed between the first electrode 1314 and the second electrode 1315, and a range of the shortest distance GP1 between the first electrode 1314 and the second electrode 1315 is between 0.3 mm and 30 mm. However, this does not intend to limit the present disclosure.

Figure 3B:
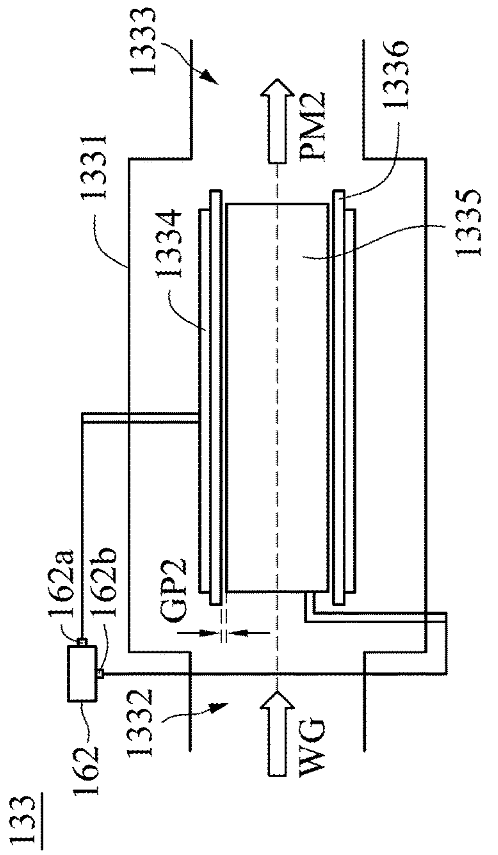
FIGS. 3A-3C are schematic views of various possible embodiments of the second plasma generator of FIG. 1.
Figure 3A:
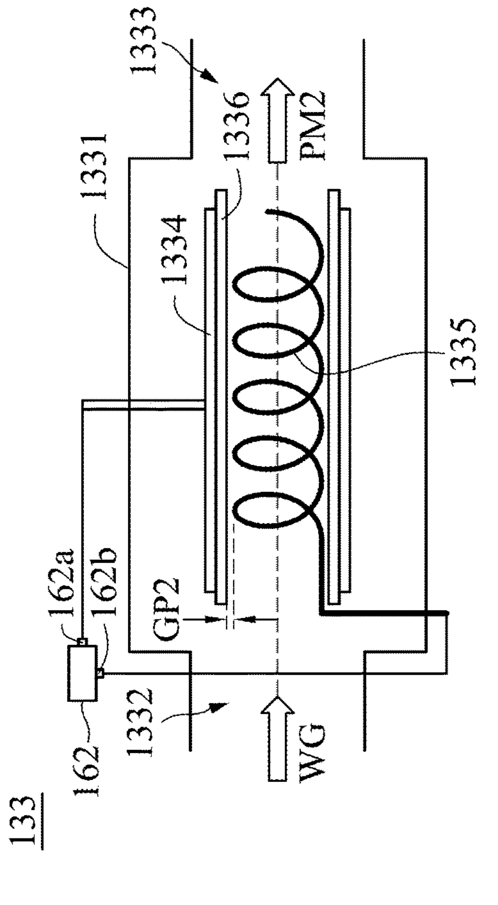
Figure 3C:
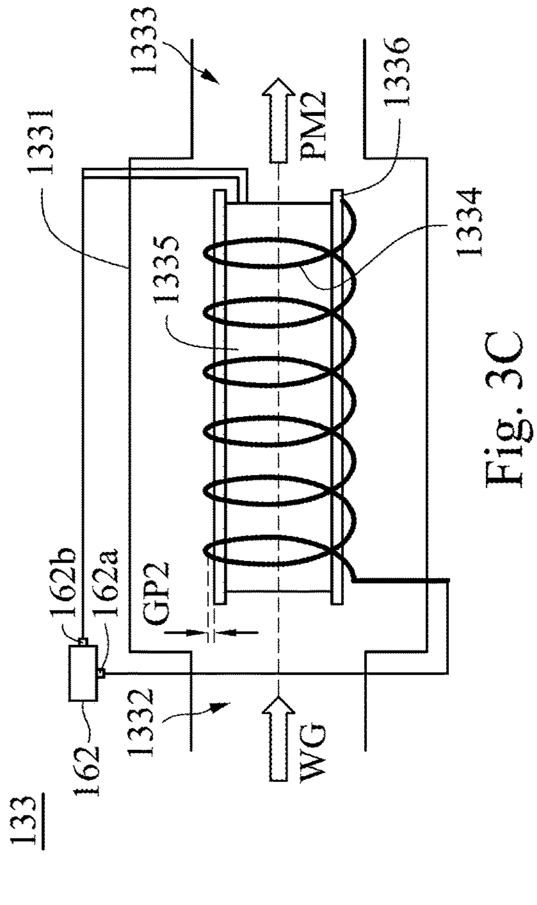

FIGS. 3A-3C are schematic views of various possible embodiments of the second plasma generator 133 of FIG. 1. In these embodiments, the second plasma generator 133 is a dielectric barrier discharge (DBD) type plasma generator. To be specific, the second plasma generator 133 includes a second chamber 1331, a dielectric tube 1336, an external electrode 1334 and an internal electrode 1335. The dielectric tube 1336 is located inside the second chamber 1331. The second chamber 1331 has an entrance 1332 and an exit 1333. The entrance 1332 and the exit 1333 are opposite to each other. The second subsidiary power source 162 includes a first contact point 162*a* and a second contact point 162*b*. The external electrode 1334 is electrically connected with the first contact point 162*a* of the second subsidiary power source 162. The internal electrode 1335 is electrically connected with the second contact point 162*b* of the second subsidiary power source 162. When the first contact point 162*a* is connected with a power line (not shown), the second contact point 162*b* is connected with a ground line (not shown) or connected to a ground. On the other hand, when the second contact point 162*b* is connected with the power line, the first contact point 162*a* is connected with the ground line or connected to the ground. The external electrode 1334 is sleeved outside an outer wall of the dielectric tube 1336. The internal electrode 1335 extends along an inner wall of the dielectric tube 1336. The internal electrode 1335 can have a spiral shape or a columnar shape. However, this does not intend to limit the present disclosure. In practical applications, the internal electrode 1335 of the second plasma generator 133 can have a spiral shape while the external electrode 1334 of the second plasma generator 133 can have a tubular shape (please see FIG. 3A), or the internal electrode 1335 can have a columnar shape while the external electrode 1334 can have a spiral shape (please see FIG. 3B), or the internal electrode 1335 can have a columnar shape while the external electrode 1334 can have a tubular shape (please see FIG. 3C). However, this does not intend to limit the present disclosure. Moreover, a range of the shortest distance GP2 between the electrode (i.e., the internal electrode 1335 or the external electrode 1334) and the dielectric tube 1336 is between 0.3 mm and 5 mm. However, this does not intend to limit the present disclosure. In addition, when the electrode has a spiral shape, the shortest distance GP2 between the electrode and the dielectric tube 1336 can be 0 mm, meaning the electrode and the dielectric tube 1336 are tightly connected.

For example, when the second plasma generator 133 is operated, the second subsidiary power source 162 respectively supplies electricity to the external electrode 1334 and the internal electrode 1335, and the working gas WG enters into the second chamber 1331 through the entrance 1332. The plasma is formed between the internal electrode 1335 and the dielectric tube 1336, or between the external electrode 1334 and the dielectric tube 1336, or at the same time between the internal electrode 1335 and the dielectric tube 1336 and between the external electrode 1334 and the dielectric tube 1336. However, the plasma is not directly formed between the external electrode 1334 and the internal electrode 1335. Afterwards, the second plasma gas PM2 formed leaves from the second chamber 1331 through the exit 1333, and then flows to and is directed to the liquid F flowing along the fluid circulation. As driven by the fine bubble generator 120, the second plasma gas PM2 in the liquid F is also delivered to the liquid tank 110 to form plasma fine bubbles B (please see FIG. 1) in micro/nano-magnitudes for subsequent usages. By the operation of DBD-type plasma generator (i.e., the second plasma generator 133), as mentioned above, the second plasma gas PM2 generated is ozone plasma. In this embodiment, the dielectric tube 1336 can be of an insulating material, such as quartz, ceramic or glass.

Selectively, the first plasma gas PM1 and the second plasma gas PM2 can flow into the gas inlet pipe A. For example, the gas inlet pipe A is connected with the liquid inlet pipe $F_{in}$, such that the first plasma gas PM1 and the second plasma gas PM2 can enter into the fine bubble generator 120 through the liquid inlet pipe $F_{in}$, and the fine bubbles generated from the fine bubble generator 120 are then discharged to the liquid tank 110 through the water outlet pipe.

On the other hand, as shown in FIG. 1, as mentioned above, the fine bubble generator 120 is signally connected with the control module 140 through the signal cable S. In practical applications, when the plasma fine bubble liquid generating apparatus 100 is started up, the control module 140 starts up the fine bubble generator 120, such that the liquid F flows between the fine bubble generator 120 and the liquid tank 110 to form the fluid circulation. When the fine bubble generator 120 is fully filled up with the liquid F, the control module 140 will receive a corresponding signal from the fine bubble generator 120 through the signal cable S. Only after receiving the signal from the fine bubble generator 120, the control module 140 starts up the first subsidiary power source 161 and/or the second subsidiary power source 162. In this way, before the fine bubble generator 120 is fully filled up with the liquid F, the first plasma gas PM1 and/or the second plasma gas PM2 from the first plasma generator 131 and/or the second plasma generator 133 are prevented from flowing into the fluid F before the fluid circulation is formed. Thus, the damage to the fine bubble generator 120 is effectively avoided.

Furthermore, in this embodiment, as shown in FIG. 1, the first plasma generator 131 and the second plasma generator 133 of the plasma generating module 130 are connected in parallel. In other words, after the working gas WG is supplied to the plasma generating module 130 by the gas supplying source 150, a portion of the working gas WG flows through the first plasma generator 131 while another portion of the working gas WG flows through the second plasma generator 133.

Figure 4:
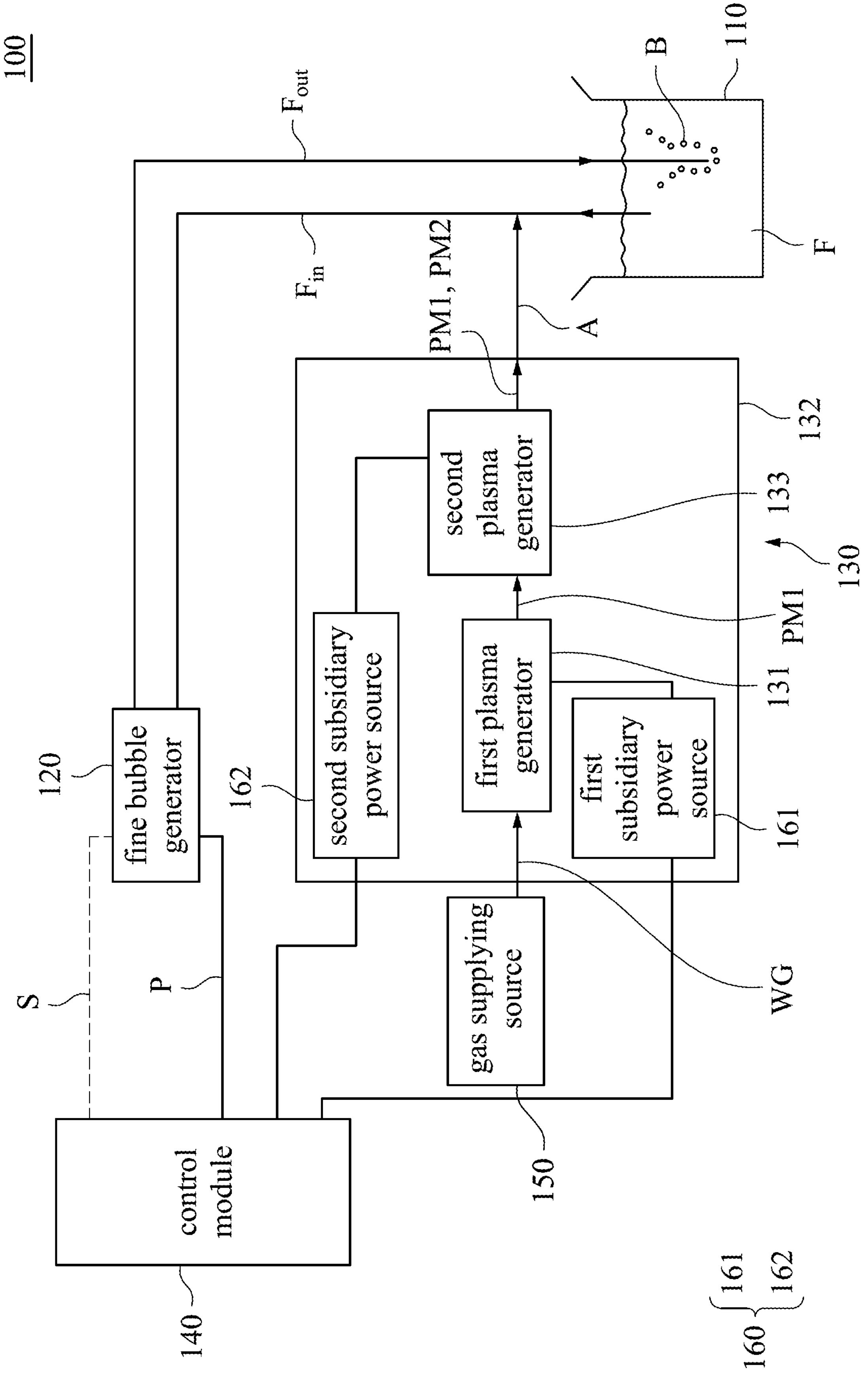
FIG. 4 is a schematic view of a plasma fine bubble liquid generating apparatus according to another embodiment of the present disclosure.

FIG. 4 is a schematic view of a plasma fine bubble liquid generating apparatus 100 according to another embodiment of the present disclosure. In this embodiment, the first plasma generator 131 and the second plasma generator 133 are connected in series. In other words, the working gas WG first flows through the first plasma generator 131, and then flows through the second plasma generator 133 together with the first plasma gas PM1 generated by the first plasma generator 131. In other embodiments, according to the actual situation, the working gas WG first flows through the second plasma generator 133, and then flows through the first plasma generator 131 together with the second plasma gas PM2 generated by the second plasma generator 133.

Figure 5:
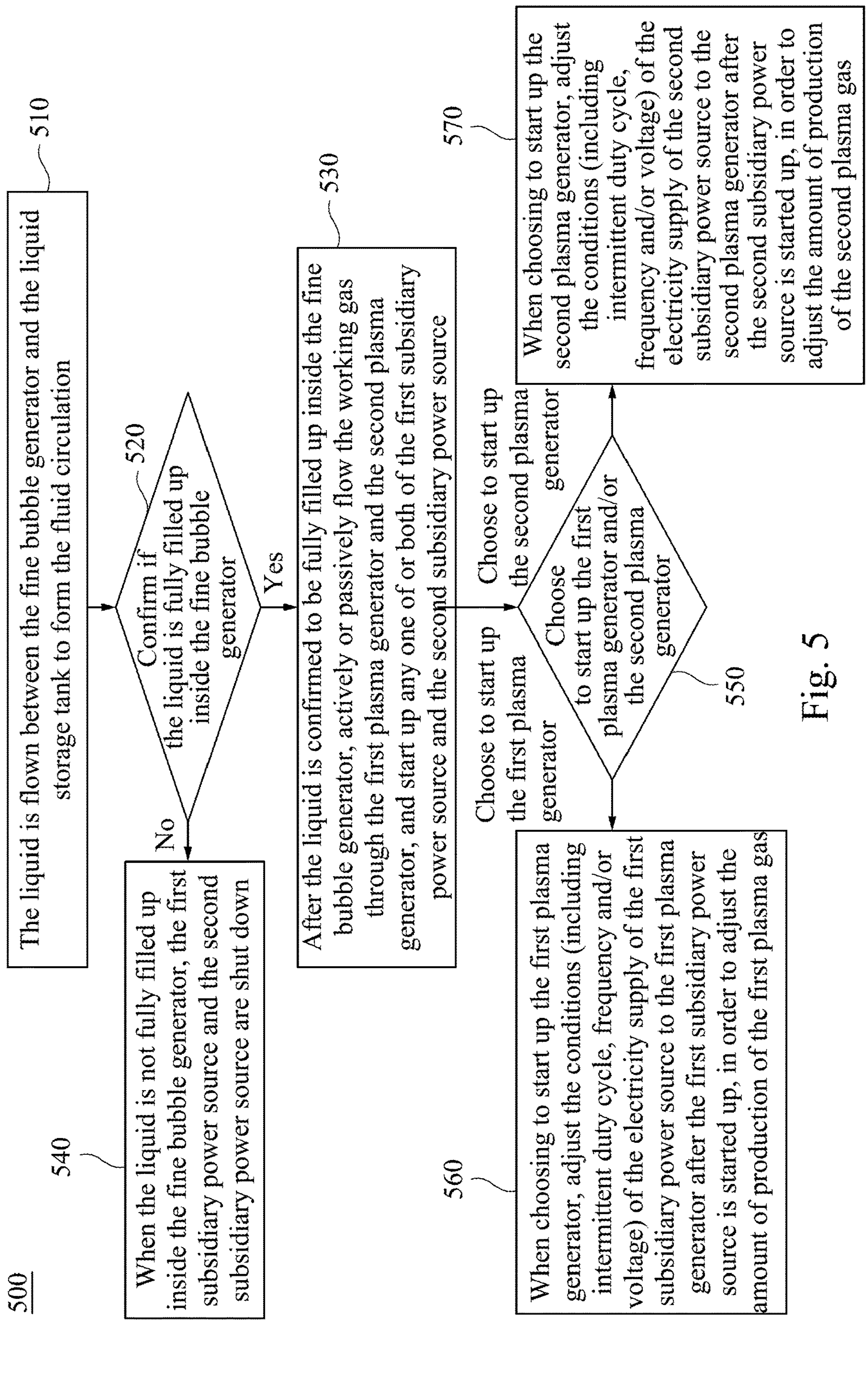
FIG. 5 is a flow diagram of a method of generating plasma fine bubble liquid according to an embodiment of the present disclosure.

FIG. 5 is a flow diagram of a method 500 of generating plasma fine bubble liquid according to an embodiment of the present disclosure. Apart from the plasma fine bubble liquid generating apparatus 100 as mentioned above, a method 500 of generating plasma fine bubble liquid is provided in the present disclosure. As shown in FIG. 5, the method 500 includes the following operations (it is appreciated that the sequence of the operations and the sub-operations as mentioned below, unless otherwise specified, can all be adjusted upon the actual needs, or even executed at the same time or partially at the same time):

(1) The liquid F is flown between the fine bubble generator 120 and the liquid tank 110 to form the fluid circulation (Operation 510). This means that the liquid F is driven to flow from the liquid tank 110 to the fine bubble generator 120, and then return from the fine bubble generator 120 to the liquid tank 110.

(2) Confirm if the liquid F is fully filled up inside the fine bubble generator 120 (Operation 520).

(3) After the liquid F is confirmed to be fully filled up inside the fine bubble generator 120, actively or passively flow the working gas WG through the first plasma generator 131 and the second plasma generator 133, and start up any one of or both of the first subsidiary power source 161 and the second subsidiary power source 162 (Operation 530). This means that the first subsidiary power source 161 and/or the second subsidiary power source 162 are started up, such that the first plasma generator 131 and/or the second plasma generator 133 generate the first plasma gas PM1 and/or the second plasma gas PM2. According to the actual situation, as mentioned above, the first plasma generator 131 and the second plasma generator 133 are connected in parallel or in series. The first plasma gas PM1 and/or the second plasma gas PM2 flow to and are directed to the liquid F flowing along the fluid circulation. The first plasma gas PM1 and/or the second plasma gas PM2 in the liquid F are then delivered to the liquid tank 110 to form plasma fine bubbles B in micro/nano-magnitudes for subsequent usages.

(4) When the liquid F is not fully filled up inside the fine bubble generator 120, the first subsidiary power source 161 and the second subsidiary power source 162 are shut down (Operation 540). In this way, the first plasma gas PM1 and/or the second plasma gas PM2 from the first plasma generator 131 and/or the second plasma generator 133 are prevented from flowing into the fluid F before the fluid circulation is formed. Thus, the damage to the fine bubble generator 120 is effectively avoided.

(5) Choose to start up the first plasma generator 131 and/or the second plasma generator 133 (Operation 550).

(6) When choosing to start up the first plasma generator 131, adjust the conditions of the electricity supply of the first subsidiary power source 161 to the first plasma generator 131 after the first subsidiary power source 161 is started up, in order to adjust the amount of production of the first plasma gas PM1 (Operation 560). The conditions of electricity supply include intermittent duty cycle, frequency and/or voltage.

(7) When choosing to start up the second plasma generator 133, adjust the conditions of the electricity supply of the second subsidiary power source 162 to the second plasma generator 133 after the second subsidiary power source 162 is started up, in order to adjust the amount of production of the second plasma gas PM2 (Operation 570). The conditions of electricity supply include intermittent duty cycle, frequency and/or voltage.

It is worth to note that, operation 560 and operation 570 can be executed at the same time or partially at the same time according to the actual situation, in order to enhance the flexibility of operation of the method 500 of generating the plasma fine bubble liquid.

Figure 6:
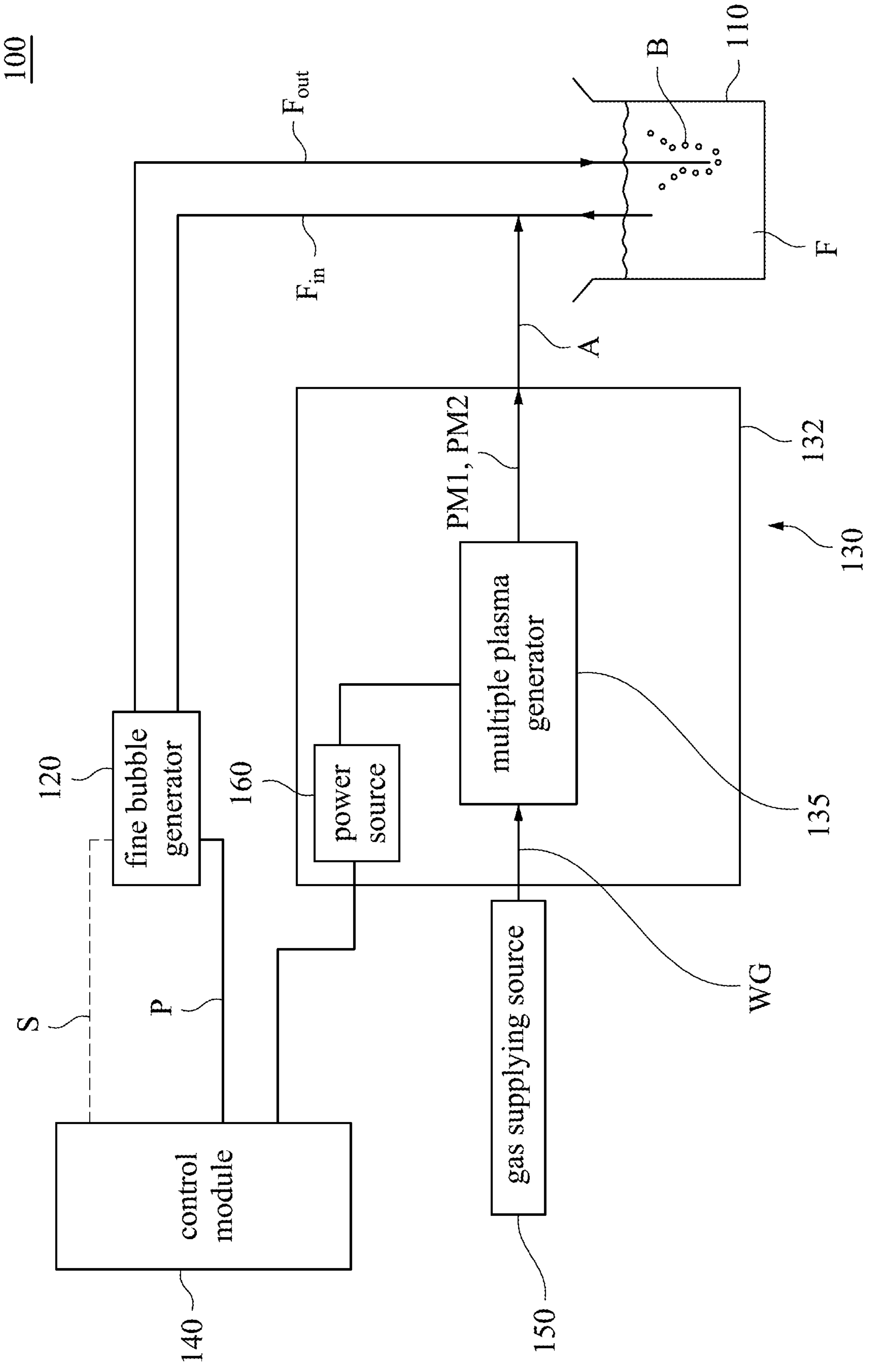
FIG. 6 is a schematic view of a plasma fine bubble liquid generating apparatus according to another embodiment of the present disclosure.

FIG. 6 is a schematic view of a plasma fine bubble liquid generating apparatus 100 according to another embodiment of the present disclosure. In this embodiment, the plasma generating module 130 includes a multiple plasma generator 135. The power source 160 supplies electricity to the multiple plasma generator 135. The working gas WG flows through the multiple plasma generator 135 to generate the first plasma gas PM1 and/or the second plasma gas PM2.

Figure 7A:
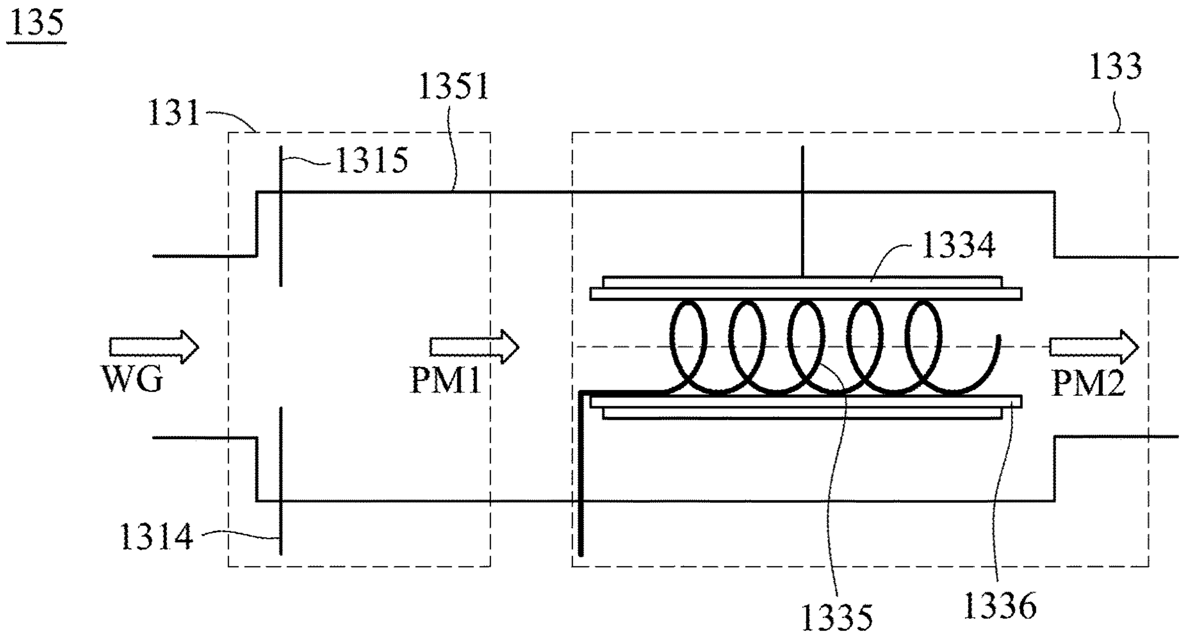
FIG. 7A is a schematic view of an embodiment of the multiple plasma generator of FIG. 6.

FIG. 7A is a schematic view of an embodiment of the multiple plasma generator 135 of FIG. 6. The multiple plasma generator 135 includes the first plasma generator 131 and the second plasma generator 133, in which the first plasma generator 131 and the second plasma generator 133 share a common chamber 1351. The first plasma generator 131 includes the first electrode 1314 and the second electrode 1315. The second plasma generator 133 includes the external electrode 1334 and the internal electrode 1335. On the operation of the plasma production, the first plasma generator 131 and the second plasma generator 133 can be switched.

Figure 7B:
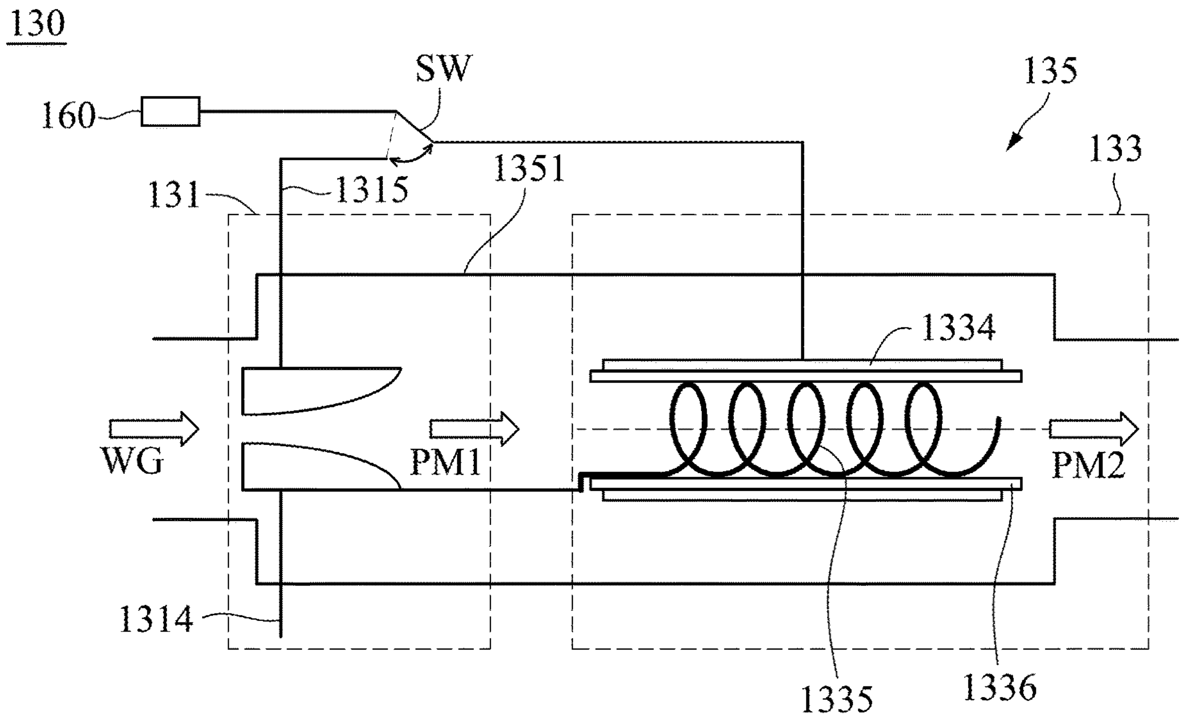
FIG. 7B is a schematic view of another embodiment of the plasma generating module of FIG. 6.

FIG. 7B is a schematic view of another embodiment of the plasma generating module 130 of FIG. 6. The multiple plasma generator 135 of the plasma generating module 130 includes the first plasma generator 131 and the second plasma generator 133, in which the first plasma generator 131 and the second plasma generator 133 share a common chamber 1351. In this embodiment, the plasma generating module 130 includes a switch SW. The switch SW is configured to switch the power (the electricity supply) to the first plasma generator 131 and the second plasma generator 133 by the power source 160. In other words, through the switch of electricity supply by the switch SW, the user can control which one of the first plasma generator 131 and the second plasma generator 133 to generate plasma, thus enhancing the flexibility of operation of the plasma fine bubble liquid generating apparatus 100.

Figure 8:
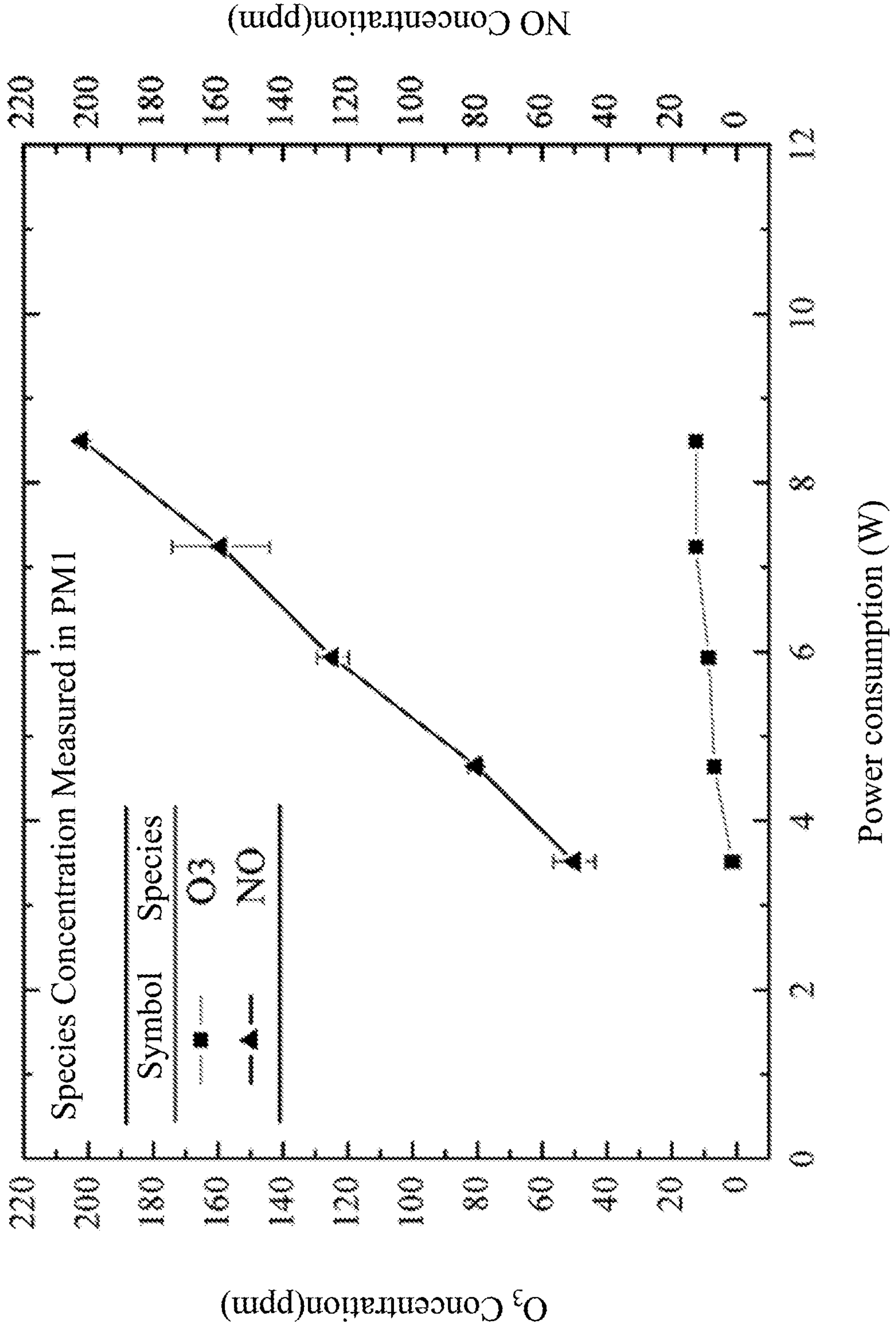
FIG. 8 and FIG. 9 are graphs respectively showing the concentrations of the first plasma gas (nitric oxide) and the second plasma gas (ozone) generated under different power consumptions according to the embodiment of FIG. 1, in which the power consumption is adjusted by the adjustment of the voltage of the electricity supply.
Figure 9:
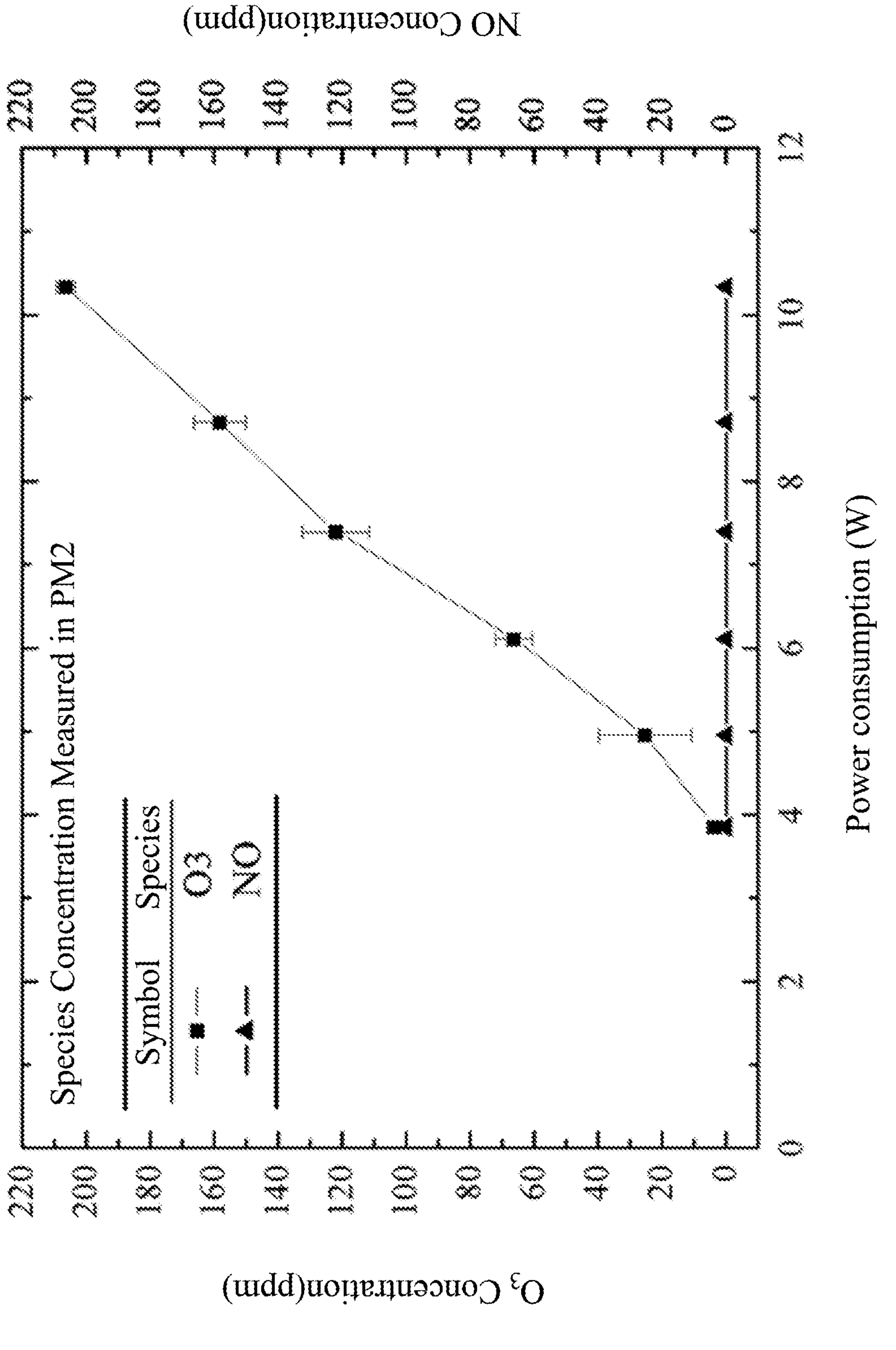

FIG. 8 and FIG. 9 are graphs respectively showing the concentrations of the first plasma gas PM1 (nitric oxide) and the second plasma gas PM2 (ozone) generated under different power consumptions according to the embodiment of FIG. 1, in which the power consumption is adjusted by the adjustment of the voltage of the electricity supply. As shown FIG. 8, it is clear that nitric oxide generated from the first plasma gas PM1 of FIG. 1 increases with the increase of the power consumption, while ozone has almost no increase. As shown FIG. 9, it is clear that ozone generated from the second plasma gas PM2 of FIG. 1 increases with the increase of the power consumption, while nitric oxide can hardly be detected. Therefore, it is obvious that nitric oxide and ozone can be selectively generated by this design of two types of plasma sources. Thus, the operation of the plasma fine bubble liquid generating apparatus 100 becomes substantially convenient.

Figure 10:
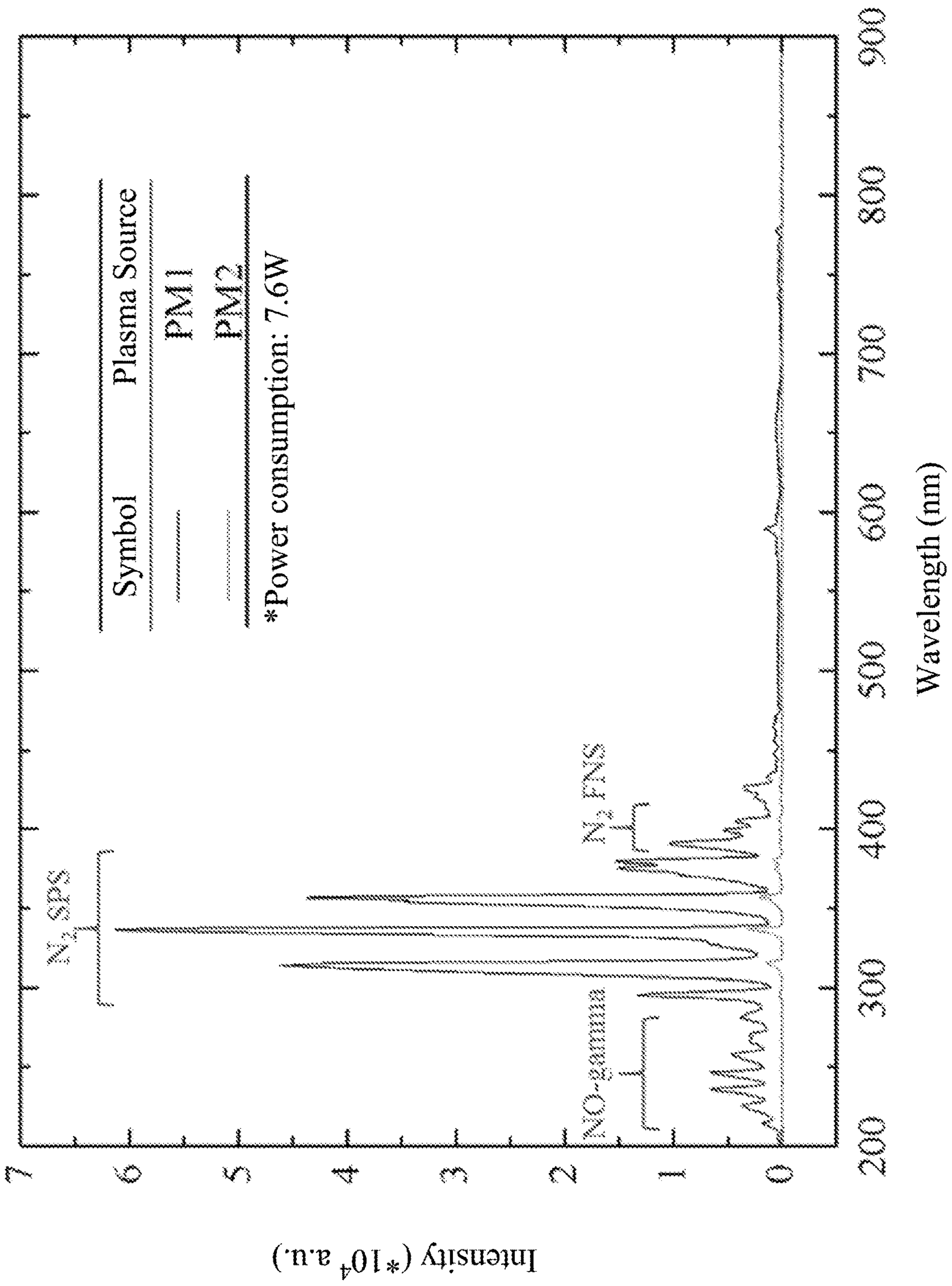
FIG. 10 is a graph of plasma spectroscopy of the first plasma gas and the second plasma gas under the power consumption of 7.6 watt according to the embodiment of FIG. 1.

FIG. 10 is a graph of plasma spectroscopy of the first plasma gas PM1 and the second plasma gas PM2 under the power consumption of 7.6 watt according to the embodiment of FIG. 1. It is clear from FIG. 10 that both of the first plasma gas PM1 and the second plasma gas PM2 are rich in the signal of nitrogen second positive system ($N_2$ SPS), which is the characteristic of the typical air plasma spectrum. However, as compared to the second plasma gas PM2, the first plasma gas PM1 additionally has a large amount of NO-gamma signal and signal of nitrogen first negative system ($N_2$ FNS), which demonstrates that the products can be different due to different designs of electrode even though both of the first plasma gas PM1 and the second plasma gas PM2 are air plasmas.

Figure 11A:
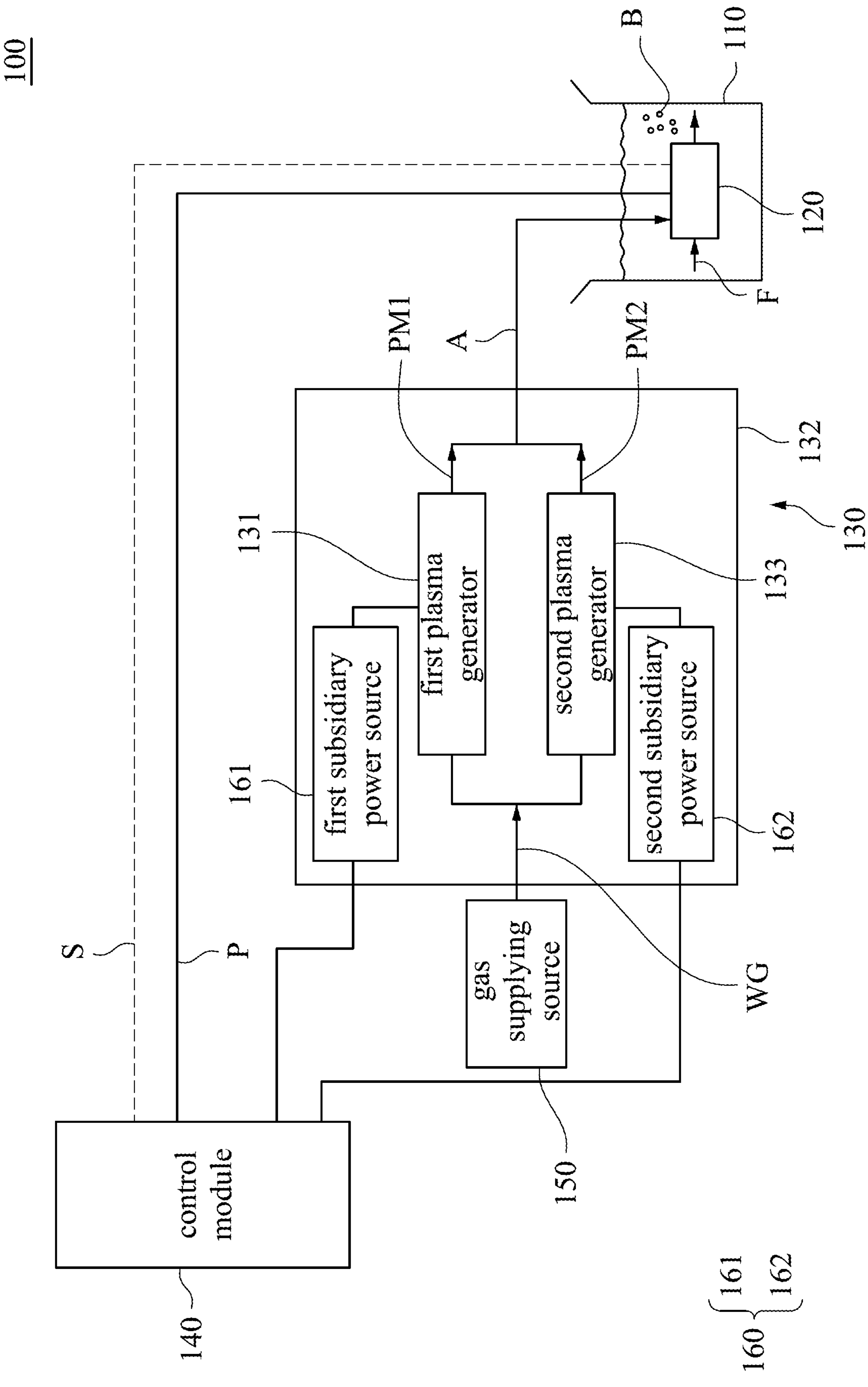
FIGS. 11A-11C are schematic views of various possible embodiments of the plasma fine bubble liquid generating apparatus.

FIG. 11A is a schematic view of another possible embodiment of the plasma fine bubble liquid generating apparatus 100. The fine bubble generator 120 is disposed inside the liquid tank 110, such that the fine bubble generator 120 is at least partially immersed in the liquid F. The fine bubble generator 120 can be supplied with electricity and controlled by the control module 140. The gas inlet pipe A is connected with the fine bubble generator 120, in order to supply the first plasma gas PM1 and/or the second plasma gas PM2 to the fine bubble generator 120. After the liquid F enters into the fine bubble generator 120, the plasma fine bubbles B are generated in the liquid F from the first plasma gas PM1 and/or the second plasma gas PM2. Afterwards, the liquid F is discharged to the liquid tank 110. This process is continuously looped in this way.

Figure 11B:
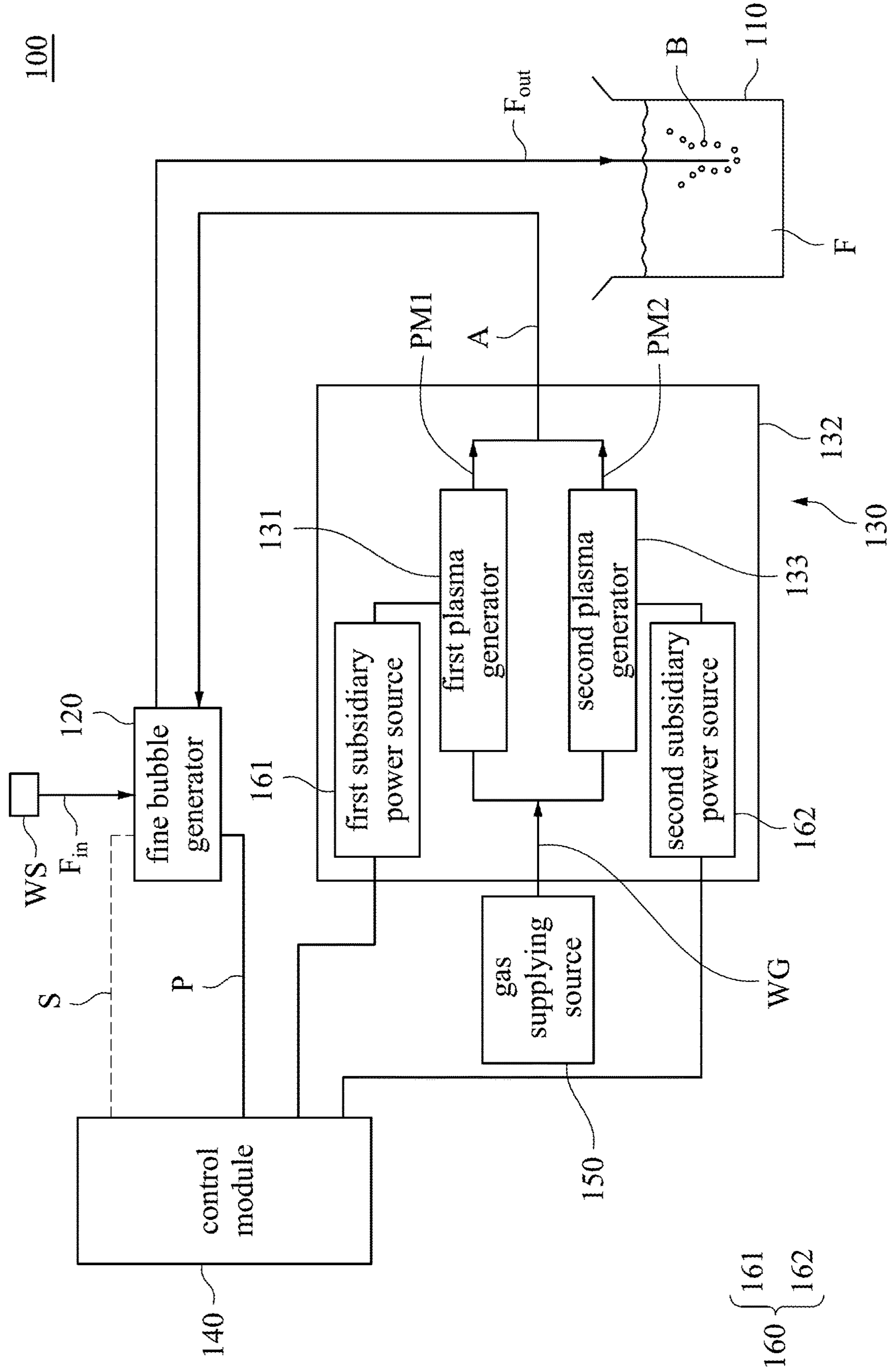

FIG. 11B is a schematic view of another possible embodiment of the plasma fine bubble liquid generating apparatus 100. The fine bubble generator 120 can intake water from the water source WS through the liquid inlet pipe $F_{in}$. The gas inlet pipe A is connected with the fine bubble generator 120. The first plasma gas PM1 and/or the second plasma gas PM2 actively or passively enter into the fine bubble generator 120, and the liquid F containing the plasma fine bubbles B is discharged through the liquid outlet pipe $F_{out}$.

Figure 11C:
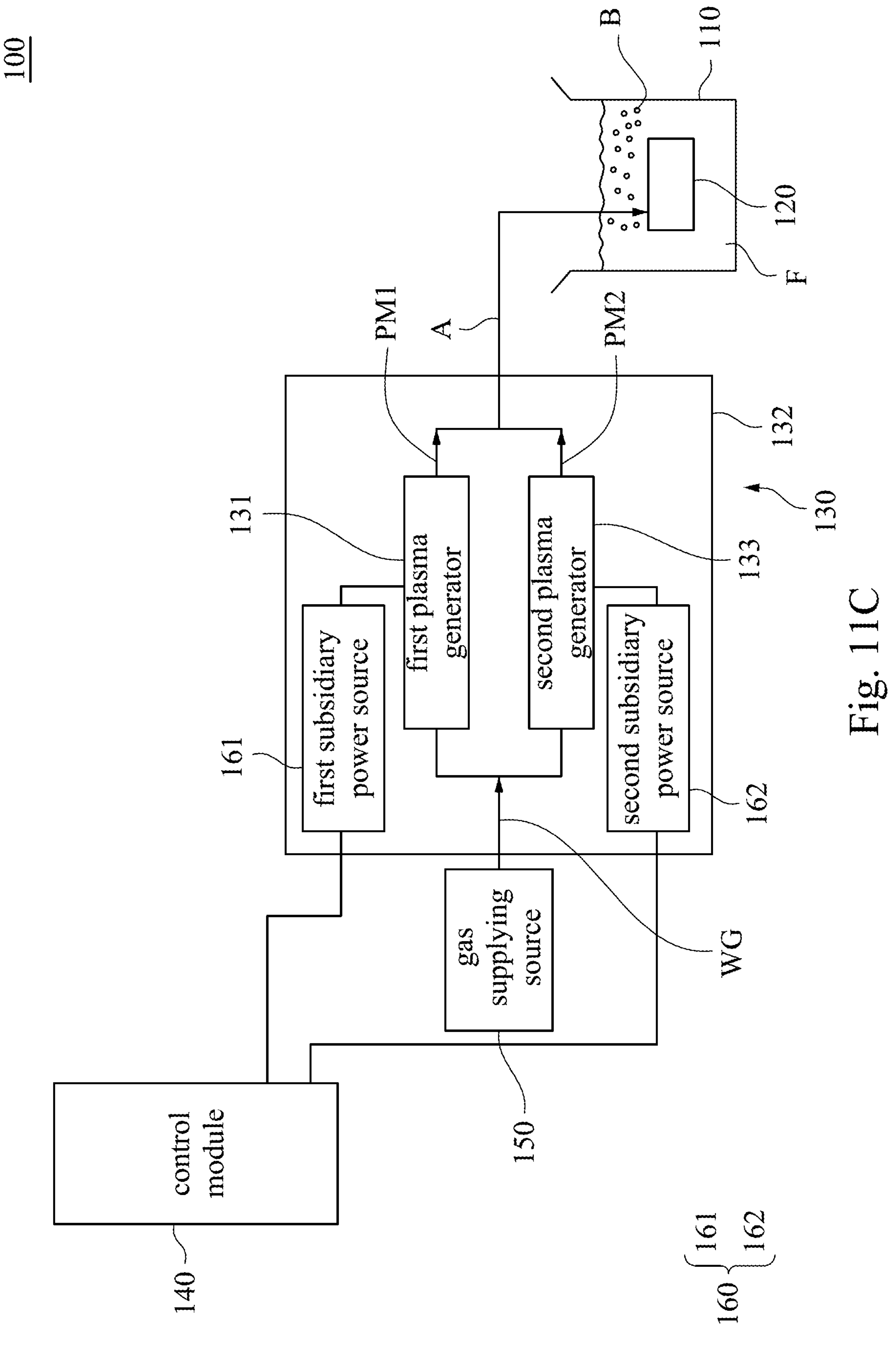

FIG. 11C is a schematic view of another possible embodiment of the plasma fine bubble liquid generating apparatus 100. The fine bubble generator 120 is disposed inside the liquid tank 110, such that the fine bubble generator 120 is at least partially immersed in the liquid F. The gas inlet pipe A is connected with the fine bubble generator 120, in order to supply the first plasma gas PM1 and/or the second plasma gas PM2 to the fine bubble generator 120. The fine bubble generator 120 can be a bubble stone. When the first plasma gas PM1 and/or the second plasma gas PM2 flow through the fine bubble generator 120, the plasma fine bubbles B can be generated in the liquid F. Afterwards, the liquid F is discharged to the liquid tank 110.

In conclusion, when compared with the prior art, the aforementioned embodiments of the present disclosure have at least the following advantage:

(1) Since the plasma generating module includes at least one first plasma generator and at least one second plasma generator, the plasma fine bubble liquid generating apparatus can generate at least two different types of plasmas, such that the flexibility of operation of the plasma fine bubble liquid generating apparatus is enhanced.

(2) Since the second subsidiary power source is independent of the first subsidiary power source, according to the actual situations, the user can choose to only start up the first subsidiary power source but not start up the second subsidiary power source, only start up the second subsidiary power source but not start up the first subsidiary power source, or start up both of the first subsidiary power source and the second subsidiary power source at the same time. When both of the first subsidiary power source and the second subsidiary power source are started up at the same time, the plasma generating module can provide a mixed plasma gas consisting of the first plasma gas and the second plasma gas. In this way, the flexibility of operation of the plasma fine bubble liquid generating apparatus is effectively enhanced.

(3) By using the control module to respectively start up the first subsidiary power source and the second subsidiary power source, and respectively adjust the conditions of electricity supply, including intermittent duty cycle, frequency and/or voltage, of the first subsidiary power source and the second subsidiary power source, the user can respectively adjust the amount of production of the first plasma gas and the second plasma gas, and also the volume ratio between the first plasma gas and the second plasma gas. Thus, the operation of the plasma fine bubble liquid generating apparatus becomes substantially convenient.

(4) By the operation of the first plasma generator, the plasma generating module can generate plasma gas containing plenty of nitric oxide.

(5) By the operation of the second plasma generator, the plasma generating module can generate plasma gas containing plenty of ozone.

Although the present disclosure has been described in considerable detail with reference to certain embodiments thereof, other embodiments are possible. Therefore, the spirit and scope of the appended claims should not be limited to the description of the embodiments contained herein.

It will be apparent to the person having ordinary skill in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. An apparatus, comprising:

a fine bubble generator configured to generate fine bubbles in a liquid;

a gas supplying source configured to supply a working gas;

a first plasma generator configured to generate a first plasma gas from the working gas, the first plasma generator comprising:

a first electrode; and a second electrode, separated from the first electrode by a distance;

a second plasma generator configured to generate a second plasma gas from the working gas;

a power source configured to supply electricity to the first plasma generator and the second plasma generator, the power source comprising a first contact point and a second contact point, the first electrode being electrically connected with the first contact point, the second electrode being electrically connected with the second contact point; and a control module configured to adjust the power source to provide power to the first plasma generator and the second plasma generator, wherein the first plasma gas and the second plasma gas are directed into the liquid, wherein when the first contact point is connected with a power line, the second contact point is connected with a ground line or connected to a ground, or when the second contact point is connected with the power line, the first contact point is connected with the ground line or connected to the ground, and wherein a range of the distance is between 0.3 mm and 30 mm.

2. The apparatus of claim 1, further comprising:

a liquid inlet pipe configured to direct the liquid into the fine bubble generator;

a liquid outlet pipe configured to discharge the liquid from the fine bubble generator; and a gas inlet pipe configured to direct the first plasma gas and/or the second plasma gas into the liquid inlet pipe and/or the liquid outlet pipe.

3. The apparatus of claim 1, further comprising a gas inlet pipe configured to direct the first plasma gas and/or the second plasma gas into the fine bubble generator, wherein the fine bubble generator is at least partially immersed in the liquid.

4. The apparatus of claim 1, further comprising a chamber and a switch, the first plasma generator and the second plasma generator are located inside the chamber, the switch is configured to switch the power to the first plasma generator and the second plasma generator.

5. The apparatus of claim 1, wherein the first plasma generator and the second plasma generator are connected in parallel, the working gas partially flows through the first plasma generator and partially flows through the second plasma generator.

6. The apparatus of claim 1, wherein the first plasma generator and the second plasma generator are connected in series, the working gas first flows through the first plasma generator and then flows through the second plasma generator, or the working gas first flows through the second plasma generator and then flows through the first plasma generator.

7. The apparatus of claim 1, further comprising:

a liquid inlet pipe configured to direct the liquid into the fine bubble generator;

a liquid outlet pipe configured to discharge the liquid from the fine bubble generator; and a gas inlet pipe configured to direct the first plasma gas and/or the second plasma gas into the fine bubble generator.

8. The apparatus of claim 7, wherein the fine bubble generator is at least partially immersed in the liquid.

9. An apparatus, comprising:

a fine bubble generator configured to generate fine bubbles in a liquid;

a gas supplying source configured to supply a working gas;

a first plasma generator configured to generate a first plasma gas from the working gas;

a second plasma generator configured to generate a second plasma gas from the working gas, the second plasma generator comprising:

a dielectric tube of an insulating material;

an external electrode sleeved outside an outer wall of the dielectric tube; and an internal electrode extending along an inner wall of the dielectric tube;

a power source configured to supply electricity to the first plasma generator and the second plasma generator, the power source comprising a first contact point and a second contact point, the external electrode being electrically connected with the first contact point, the internal electrode being electrically connected with the second contact point; and a control module configured to adjust the power source to provide power to the first plasma generator and the second plasma generator, wherein the first plasma gas and the second plasma gas are directed into the liquid, and wherein when the first contact point is connected with a power line, the second contact point is connected with a ground line or connected to a ground, or when the second contact point is connected with the power line, the first contact point is connected with the ground line or connected to the ground.

10. An apparatus, comprising:

a fine bubble generator configured to generate fine bubbles in a liquid;

a gas supplying source configured to supply a working gas;

a first plasma generator configured to generate a first plasma gas from the working gas;

a second plasma generator configured to generate a second plasma gas from the working gas;

a power source configured to supply electricity to the first plasma generator and the second plasma generator;

a control module configured to adjust the power source to provide power to the first plasma generator and the second plasma generator;

a chamber, the first plasma generator and the second plasma generator being located inside the chamber; and a switch configured to switch the power to the first plasma generator and the second plasma generator, wherein the first plasma gas and the second plasma gas are directed into the liquid.

* * * * *